United States Patent [19]

Hamann et al.

[11] Patent Number: 5,935,546

[45] Date of Patent: Aug. 10, 1999

[54] METHOD FOR REMOVING TRACES OF HEAVY METALS FROM CONCENTRATED ALKALI METAL CHLORIDE SOLUTIONS DOWN INTO THE RANGE OF 0.01 PPM

[75] Inventors: Carl Heinz Hamann, Ovelgoenne; Peter Schmittinger, Niederkassel; Joerg Helling, Oldenburg; Stefan Scholz, Bruehl, all of Germany

[73] Assignee: Huels Aktiengesellschaft, Marl, Germany

[21] Appl. No.: 08/929,102

[22] Filed: Sep. 15, 1997

[30] Foreign Application Priority Data

Sep. 14, 1996 [DE] Germany ............ 196 37 576

[51] Int. Cl.$^6$ ...................................... C01D 3/16
[52] U.S. Cl. .................... 423/499.5; 423/499.1; 423/499.4
[58] Field of Search ............. 423/499.1, 499.4, 423/499.5

[56] References Cited

U.S. PATENT DOCUMENTS

| 2,982,608 | 5/1961 | Clement | 423/499.1 |
| 3,310,370 | 3/1967 | Kendall, Jr. | 423/499.1 |
| 5,021,079 | 6/1991 | Nakane | 423/499.4 |
| 5,478,447 | 12/1995 | Ninane et al. | 423/499.5 |

FOREIGN PATENT DOCUMENTS

| 1494611 | 7/1967 | France | 423/499.5 |
| 34 37 137 | 4/1986 | Germany . | |
| 53-91151 | 8/1978 | Japan | 423/499.5 |
| 1325015 | 7/1987 | U.S.S.R. | 423/499.5 |

OTHER PUBLICATIONS

Gary R. Legendre, et al., Environmental Science and Technology, vol. 9, No. 8, pp. 744–749, Aug. 1975, "Removal of Dissolved Molybdenum from Wastewaters by Precipitates of Ferric Iron".

Patent Abstracts of Japan, vol. 11, No. 124 (C–416), Apr. 17, 1987, JP 61–263607, Nov. 21, 1986.

*Primary Examiner*—Ngoc-Yen Nguyen
*Attorney, Agent, or Firm*—Oblon, Spivak, McClelland, Maier & Neustadt, P.C.

[57] ABSTRACT

A method is provided for removing traces of heavy metals from concentrated alkali metal chloride solutions down into the range of 0.01 ppm by coprecipitation from an acidic concentrated alkali metal chloride solution with iron oxide hydrate.

18 Claims, No Drawings

METHOD FOR REMOVING TRACES OF HEAVY METALS FROM CONCENTRATED ALKALI METAL CHLORIDE SOLUTIONS DOWN INTO THE RANGE OF 0.01 PPM

BACKGROUND OF THE INVENTION

1. Field of the Invention

The present invention relates to an improved method for removing traces of heavy metals from concentrated alkali metal chloride solutions, particularly to bring the level of such heavy metals down to below the level of detectability into the range of 0.01 ppm or less.

2. Discussion of the Background

During the operation of a chlorine-alkali-electrolysis according to the amalgam process, the presence of heavy-metal ions may give rise to serious problems. These metals cause a reduction in the hydrogen overpotential, so that hydrogen is generated instead of amalgam being formed. Even small amounts of iron, cobalt, nickel or tungsten cause an increased hydrogen content in the chlorine. Small amounts of calcium, magnesium, aluminum or barium can also cause an increase in the hydrogen content in the chlorine, as well as higher amounts of sodium and potassium (>0.5%).

The most serious effects, however, are observed with vanadium, molybdenum and chromium. These metals have a strong effect even in trace amounts (ppb). During the process, the elements Cr, Ni, V and Mo tend to accumulate in the working brine, since they or their compounds are unaffected by the conventional alkaline carbonate precipitation and since the brine is recirculated.

The principle of picking up traces of less readily precipitable substances by means of coprecipitation is known from radiochemistry and nuclear chemistry and from other fields (Kirk Othmer (3rd), 19, 692–228). In water/ wastewater chemistry the coprecipitation of traces of heavy metals is covered by the prior art (Ullmann (4th) 6, 441 et seq.). In particular it is reported, for example in Environmental Science & Technology [(9th) 8, 744 et seq.] that it was possible to reduce the molybdenum level of river water by 95% to 0.05 ppm by means of precipitation at pH values between 3 and 4.

However, such a process has never before been successful in treating solutions with high levels of alkali metal chlorides, such as are produced by the conventional chlorine-alkali electrolysis process.

SUMMARY OF THE INVENTION

Accordingly, one object of the present invention is to provide a method for removing trace heavy metals to avoid the problems in chlorine-alkali electrolysis which are caused by heavy-metal ions.

A further object of the present invention is to provide a method for reducing the amount of trace heavy metals in chlorine-alkali electrolysis processes down to a level of 0.01 ppm or less.

These and other objects of the present invention have been satisfied by a method for removing traces of heavy metals, comprising:

admixing an alkali metal chloride solution containing one or more heavy metals with an iron salt solution;

incubating to form flocculae comprising iron oxide hydrate and said one or more heavy metals; and separating said flocculae from solution to provide a product solution having reduced heavy metal levels.

DETAILED DESCRIPTION OF THE PREFERRED EMBODIMENTS

The present process provides a surprising ability to dramatically reduce the level of trace heavy metals even in the case of a high salt load in the aqueous phase. This is a surprising result since, due to the high ionic strength of the iron oxide hydrate precipitation, the conditions cannot be compared with those in the case of precipitation from dilute wastewaters contaminated with pollutants.

The method according to the present invention provides a removal from the alkali metal chloride solution, preferably sodium chloride solution or potassium chloride solution, of troublesome metal salts down into the range of the detection limit of 0.01 ppm. The alkali metal chloride solution used in the present process preferably has an alkali metal chloride concentration of at least 10% by weight, more preferably at least 15% by weight, most preferably at least 20% by weight.

The metals removed by the present method include any of the metals conventionally classified as "heavy metals" as well as others. Within the context of the present invention, the term "heavy metals" includes, but is not limited to, metals such as iron, cobalt, nickel, tungsten, calcium, magnesium, aluminum, barium, vanadium, molybdenum and chromium. The method is particularly useful for removal of trace levels of vanadium, nickel, chromium and molybdenum, most preferably molybdenum.

In the process of the present invention, the precipitant is an iron(m) salt, preferably selected from iron(III) halide, phosphate, nitrate, most preferably iron(III) chloride.

The precipitant is admixed with the alkali metal chloride solution in an amount sufficient to bring the mixture to a pH of from 5 to 2, preferably from 5 to 3. Once the proper pH has been reached, a precipitate of iron oxide hydrate is formed. After approximately 10 min. to 10 hours, preferably 30 min. to 5 hours, medium-size flocculae begin to form. These flocculae are then readily removed using conventional separation methods, such as filtration or centrifugation, preferably filtration.

After removal of these flocculae, the residual heavy metal concentration is less than 0.05 ppm, preferably less than 0.01 ppm.

The process of the present invention is performed at a temperature conventional to the operation of chlorine-electrolysis according to the amalgam process, preferably from 10° C. to 90° C., more preferably from 15° C. to 50° C., most preferably from 20° C. to 30° C. The separation step should be performed at as low a temperature as possible, in order to reduce the solubility of the iron oxide hydrate and the resulting flocculae. However, the temperature should be maintained at a range sufficient to avoid freezing and sufficient to keep a low enough viscosity to assist handling in the separation step. The separation step should preferably be performed at a temperature from 10° C. to 50° C., more preferably 15° C. to 30° C., most preferably from 20° C. to 25° C.

EXAMPLE

Having generally described this invention, a further understanding can be obtained by reference to the following specific example which is provided herein for purposes of illustration only and is not intended to be limiting unless otherwise specified.

An acidic (pH=5) soda brine (24.5 wt. % of NaCl) was provided and was spiked with an amount of molybdenum sufficient to provide a molybdenum level of 0.4 ppm. This mixture was admixed with iron(III) chloride solution (40 wt. % of $FeCl_3$) until a pH of 3 was reached.

This required about 0.5 ml per liter of initial acidic soda brine charge. A brown precipitate of iron oxide hydrate was formed that, as it aged, formed medium-size flocculae and was readily filtered off.

The residual molybdenum level in the filtrate was below the detection limit of 0.01 ppm of Mo. Chlorine dissolved in the brine did not interfere with the purification process.

The present application is based on German Priority Application 196 37 576.2, filed with the German Patent Office on Sep. 14, 1996, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for removing traces of heavy metals, comprising:

admixing an acidic alkali metal chloride solution containing one or more heavy metals with an iron salt solution wherein said acidic alkali metal chloride solution has a concentration of alkali metal chloride of at least 10% by weight, and wherein said iron salt solution is metered into said acidic alkali metal chloride solution in an amount sufficient to provide a pH of the resulting solution of from 5 to 2;

incubating the resulting solution to form flocculae comprising iron oxide hydrate and said one or more heavy metals; and separating said flocculae from the incubated solution to provide a product solution having reduced heavy metal levels.

2. The method as claimed in claim 1, wherein said iron salt solution comprises an iron (III) salt.

3. The method as claimed in claim 2, wherein said iron (III) salt is a member selected from the group consisting of iron (III) halides, iron (III) phosphate and iron (III) nitrate.

4. The method as claimed in claim 3, wherein said iron (III) salt is an iron (III) halide.

5. The method as claimed in claim 4, wherein said iron (III) halide is iron (III) chloride.

6. The method as claimed in claim 1, wherein said pH of the resulting solution is from 5 to 3.

7. The method as claimed in claim 1, wherein said incubation step is performed for a time of from 10 min to 10 hours.

8. The method as claimed in claim 1, wherein said incubation step is performed at a temperature of from 10° C. to 90° C.

9. The method as claimed in claim 8, wherein said temperature is from 15° C. to 50° C.

10. The method as claimed in claim 9, wherein said temperature is from 20° C. to 30° C.

11. The method as claimed in claim 1, wherein after said separating of said flocculae, the resulting solution has a heavy metal content of no greater than 0.05 ppm.

12. The method as claimed in claim 11, wherein said heavy metal content is no greater than 0.01 ppm.

13. The method as claimed in claim 1, wherein said separating step is performed at a temperature of from 10° C. to 50° C.

14. The method as claimed in claim 1, wherein said concentration of alkali metal chloride is at least 15% by weight.

15. The method as claimed in claim 1, wherein alkali metal chloride solution is a member selected from the group consisting of sodium chloride solution and potassium chloride solution.

16. The method as claimed in claim 15, wherein said alkali metal chloride solution is sodium chloride solution.

17. The method as claimed in claim 1, wherein said one or more heavy metals are selected from the group consisting of molybdenum, chromium, vanadium and nickel.

18. The method as claimed in claim 1, wherein the acidic alkali metal chloride solution has a pH of 5 and a concentration of NaCl of 24.5 wt. %, and wherein said solution contains molybdenum at a level of 0.4 ppm, and wherein the iron salt solution is a solution of 40 wt. % $FeCl_3$.

* * * * *